United States Patent [19]

Aharoni et al.

[11] 4,362,851

[45] Dec. 7, 1982

[54] ADDUCTS OF POLYAMIDE AND PERFLUORO-DICARBOXYLIC ACID

[75] Inventors: Shaul M. Aharoni, Morris Plains; Edel Wasserman, Summit, both of N.J.

[73] Assignee: Allied Corporation, Morris Township, Morris County, N.J.

[21] Appl. No.: 180,754

[22] Filed: Aug. 25, 1980

[51] Int. Cl.[3] ........................ C08G 69/46; C08G 69/48

[52] U.S. Cl. ........................................ 525/420; 521/61; 525/419; 528/486

[58] Field of Search ............................ 525/420, 419, 5; 528/486

[56] References Cited

U.S. PATENT DOCUMENTS

| | | | |
|---|---|---|---|
| 2,951,777 | 9/1960 | Zimmerman | 525/420 |
| 3,081,281 | 3/1963 | Beghin | 525/420 |
| 3,454,351 | 7/1969 | Perry | 525/420 |
| 3,839,530 | 10/1974 | Bingham et al. | 525/420 |
| 4,218,549 | 8/1980 | Jadamus et al. | 525/420 |

OTHER PUBLICATIONS

Journal of Applied Polymer Science, vol. 21, No. 1 (Jan., 1977), pp. 181–189.

*Primary Examiner*—Harold D. Anderson

*Attorney, Agent, or Firm*—Alan M. Doernberg; Robert A. Harman

[57] ABSTRACT

Crystalline adducts of the polyamides: poly-e-caproamide, poly(hexamethylene adipamide), poly-p-benzamide, poly(p-benzanilidene terephthalamide), and mixtures thereof; with the perfluorinated diacids: perfluorosuccinic acid, perfluoroglutaric acid, perfluoroadipic acid, and mixtures thereof. The polyamide components of the adducts contain at least 25 about amide groups in the polymer chain, preferably at least 75 amide groups for aliphatic polyamides and at least 50 amide groups for aromatic polyamides. The adducts can be formed into shaped objects from which diacid can be leached to produce a porous object useful for example as a filtration device.

12 Claims, 5 Drawing Figures

WIDE ANGLE X-RAY DIFFRACTION
INTENSITY IN ARBITRARY UNITS
2θ
6 8 10 12 14 16 18 20 22 24 26 28 30 32 34 36 38 40 42 44 46 48 50 52 54 56 58 60
A PERFLUOROGLUTARIC ACID/ POLY-P-BENZAMIDE
B POLY-P-BENZAMIDE

ADDUCTS OF POLYAMIDE AND PERFLUORO-DICARBOXYLIC ACID

BACKGROUND OF THE INVENTION

This invention relates to adducts obtained from particular polyamide polymers and particular diacid molecules. It is known to produce crystalline salts from certain alkyl benzimidazole polymers, with formic acid or trifluoroacetic acid (Aharoni et al., Journal of Applied Polymer Science, vol. 21, of 1977, pages 181–189). The molecular packing modes and hydrogen bonding properties of certain complexes between monomeric amides and dicarboxylic acids have been studied (Acta Cryst., vol. B33 of 1977, pages 2719–33).

SUMMARY

Polyamide/perfluoro dicarboxylic acid adducts in accordance with this invention broadly are those in which the number of atoms (C and N) in one chain of an aminocarboxylic acid moiety of such polyamide is the same as the sum of the carbon atoms in one chain of such dicarboxylic acid plus 2 (accounting for one of the diacid carbonyl oxygen atoms and one of its hydroxyl oxygen atoms) within $\pm 1$. For example, nylon-11 will interact with perfluoroazelaic acid to form the crystalline adduct. If for a polyamide from diamine and dicarboxylic acid, the number of carbon atoms plus N atoms in one chain of its diamine moiety and the number of carbon atoms in one chain of its dicarboxylic acid moiety are equal within 2 atoms, and have a mean value within $\pm 1$ of the sum of carbon atoms in one chain of the dicarboxylic acid plus 2, as for example in poly(hexamethylene adipamide) and in poly(p-phenylene terephthalamide), a complex can be formed with perfluoroglutaric acid.

More specifically in accordance with this invention, a crystalline adduct is provided of a polyamide of the group consisting of poly-e-caproamide, poly(hexamethylene adipamide), poly-p-benzamide, poly(p-phenylene terephthalamide), poly(p-benzanilidine terephthalamide), and mixtures thereof, in 1:1 mol ratio of amide groups of the polymer: carboxylic acid groups provided by the total added dicarboxylic acid. The dicarboxylic acid is of the group consisting of perfluorosuccinic acid, perfluoroglutaric acid, perfluoroadipic acid and mixtures thereof. The polyamide in accordance with the invention contains at least 25 amide groups in the polymer chain.

DRAWINGS

FIGS. 1–3 show Wide Angle X-Ray Diffraction patterns as follows:

FIG. 1, Curve A: Perfluorosuccinic acid/nylon-6

FIG. 1, Curve B: Perfluoroglutaric acid/nylon-6

FIG. 1, Curve C: Perfluoroadipic acid/nylon-6

FIG. 1, Curve D: Nylon-6 alone.

FIG. 2, Curve A: Perfluoroglutaric acid/nylon-66

FIG. 2, Curve B: Nylon 66 alone.

FIG. 3, Curve A: Perfluoroglutaric acid/poly-p-benzamide

FIG. 3, Curve B: Poly-p-benzamide alone.

DETAILED DESCRIPTION

Figure 1:
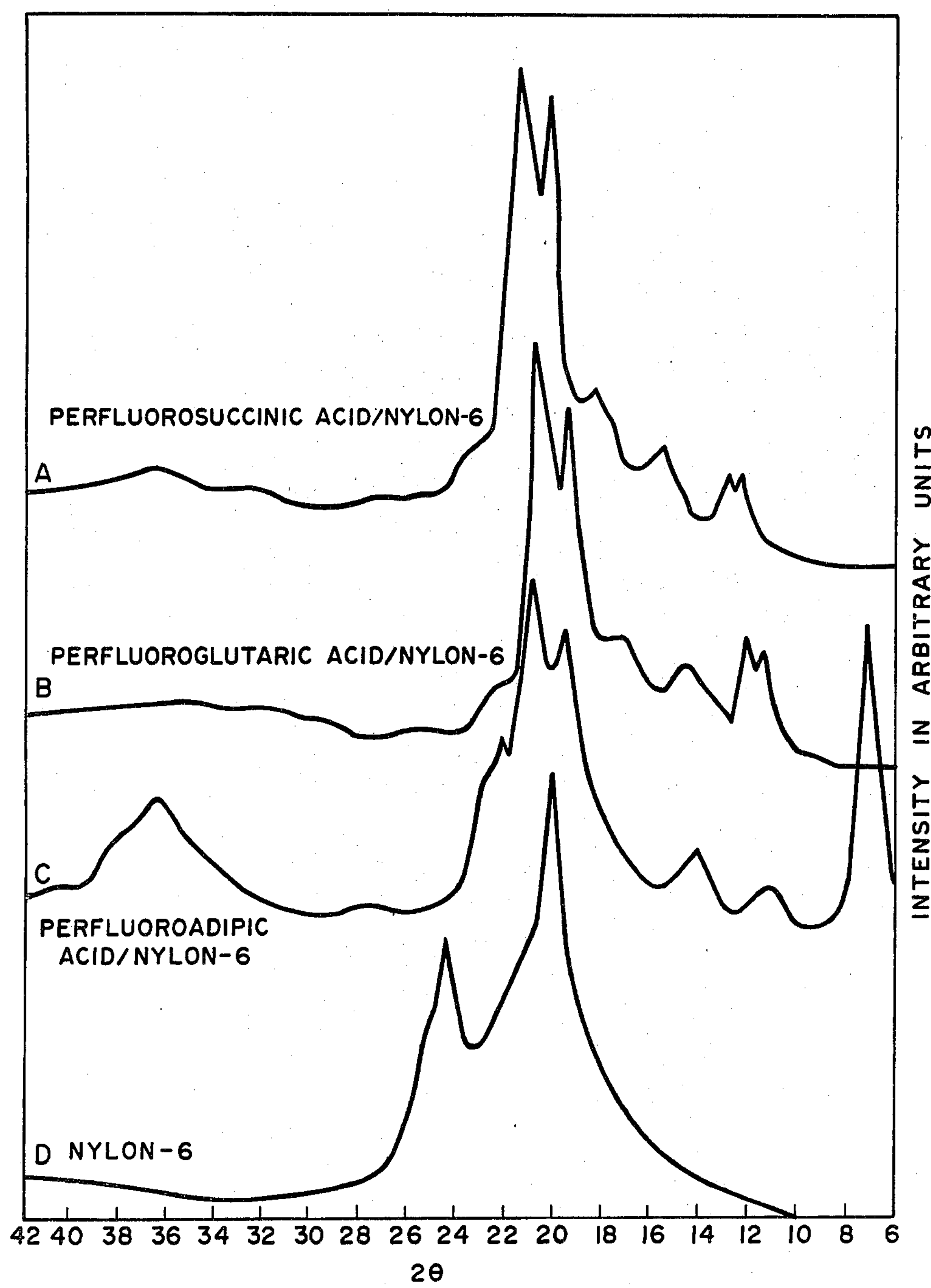
Figure 2:
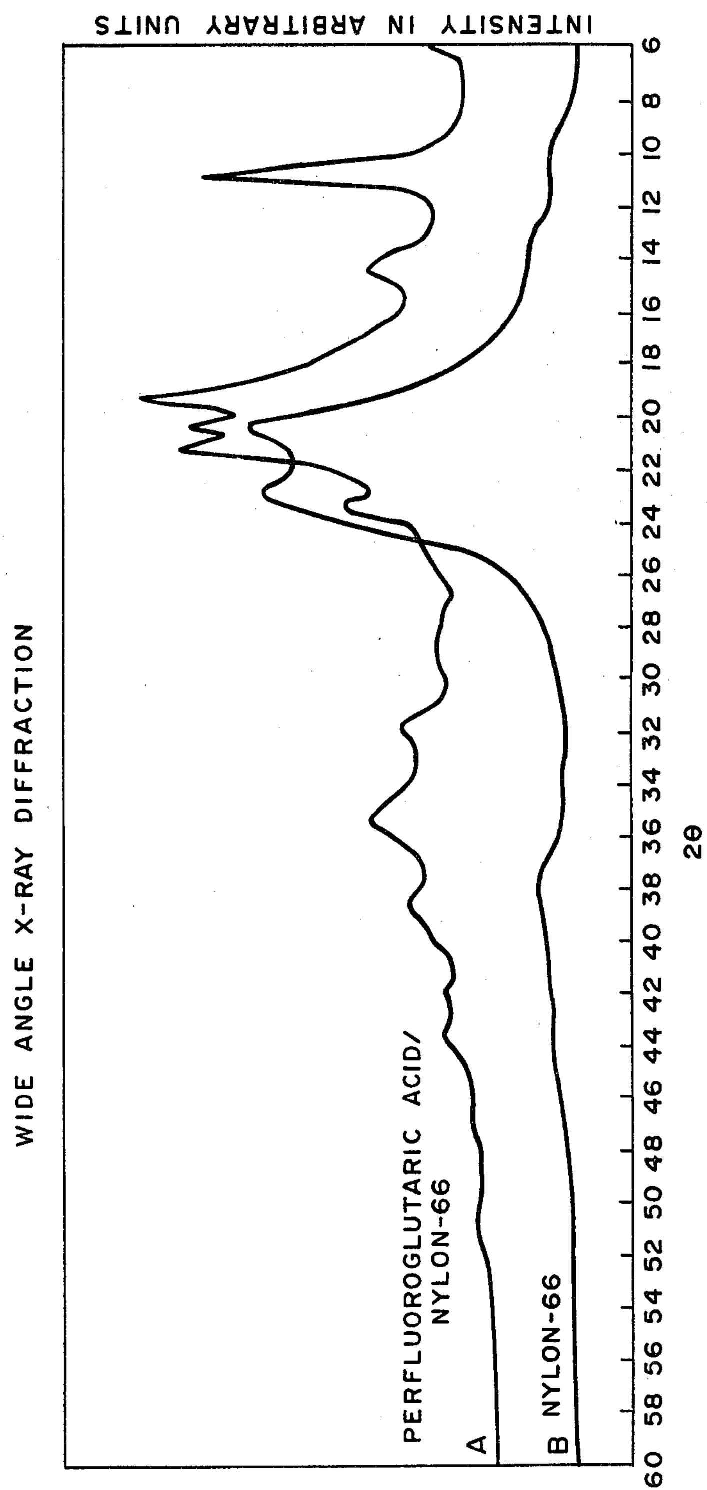
Figure 3:
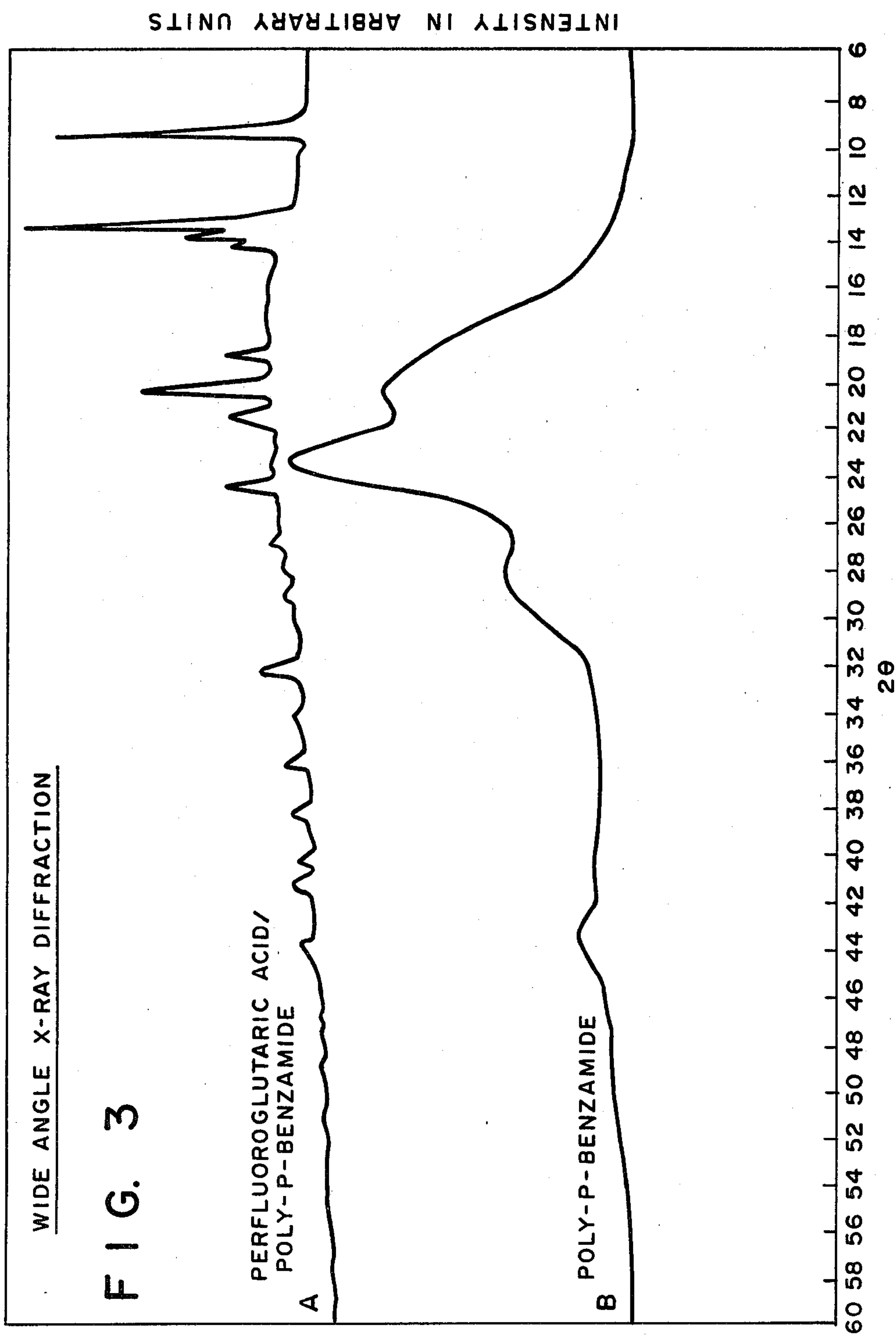

The Wide Angle X-Ray Diffraction patterns shown in FIGS. 1–3 demonstrate the crystallinity of the adducts of the invention. It will be noted that each such pattern of the parent polyamide is radically different from that of the adduct. Except for traces of lithium chloride in certain of the samples made with a solvent including the same, there were no indications of impurities in these x-ray patterns.

Figure 4:
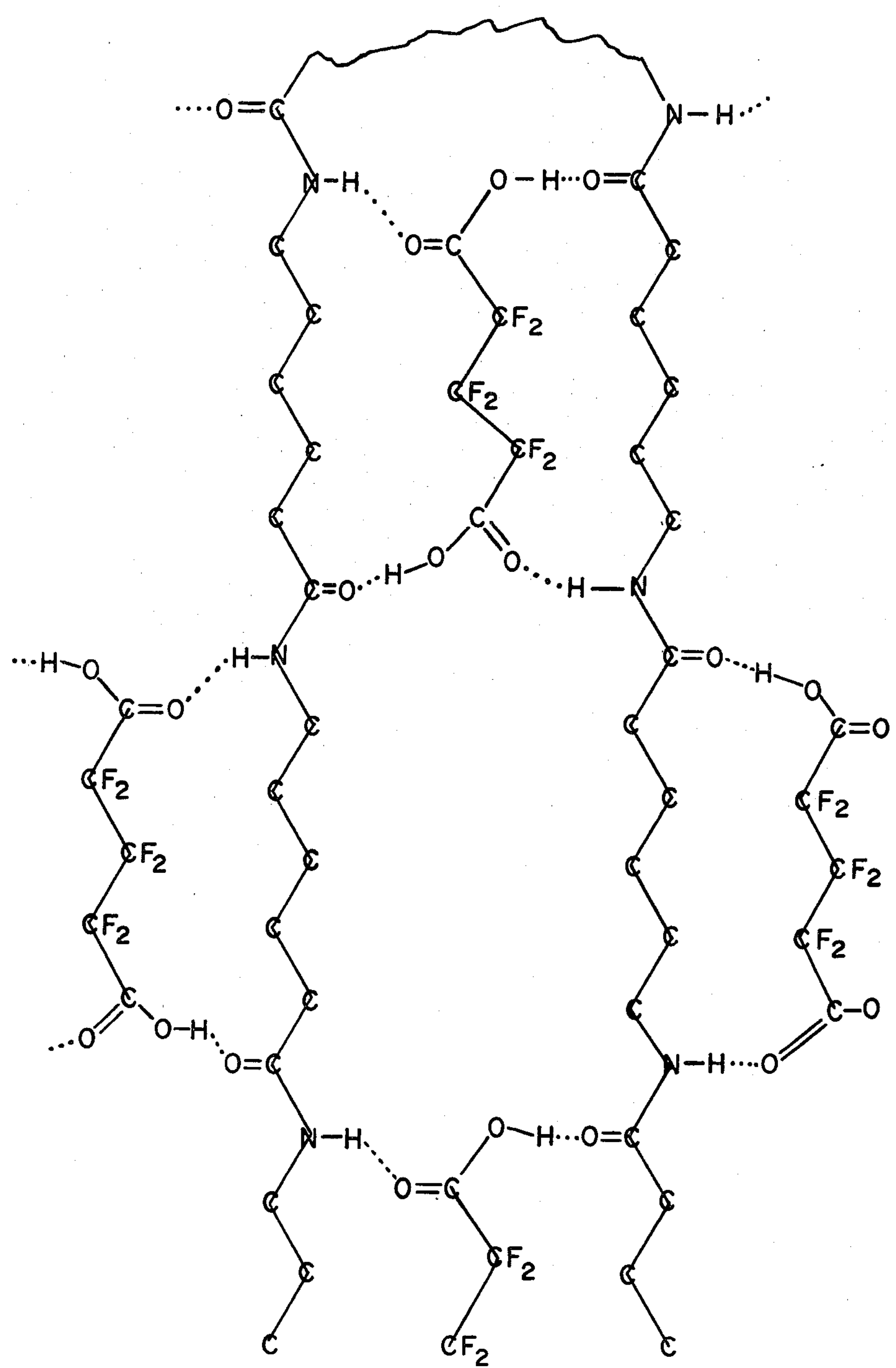
FIG. 4 is a diagrammatic showing of a possible structure of perfluoroglutaric acid/nylon-6 adduct, consistent with the data hereinafter outlined.
Figure 5:
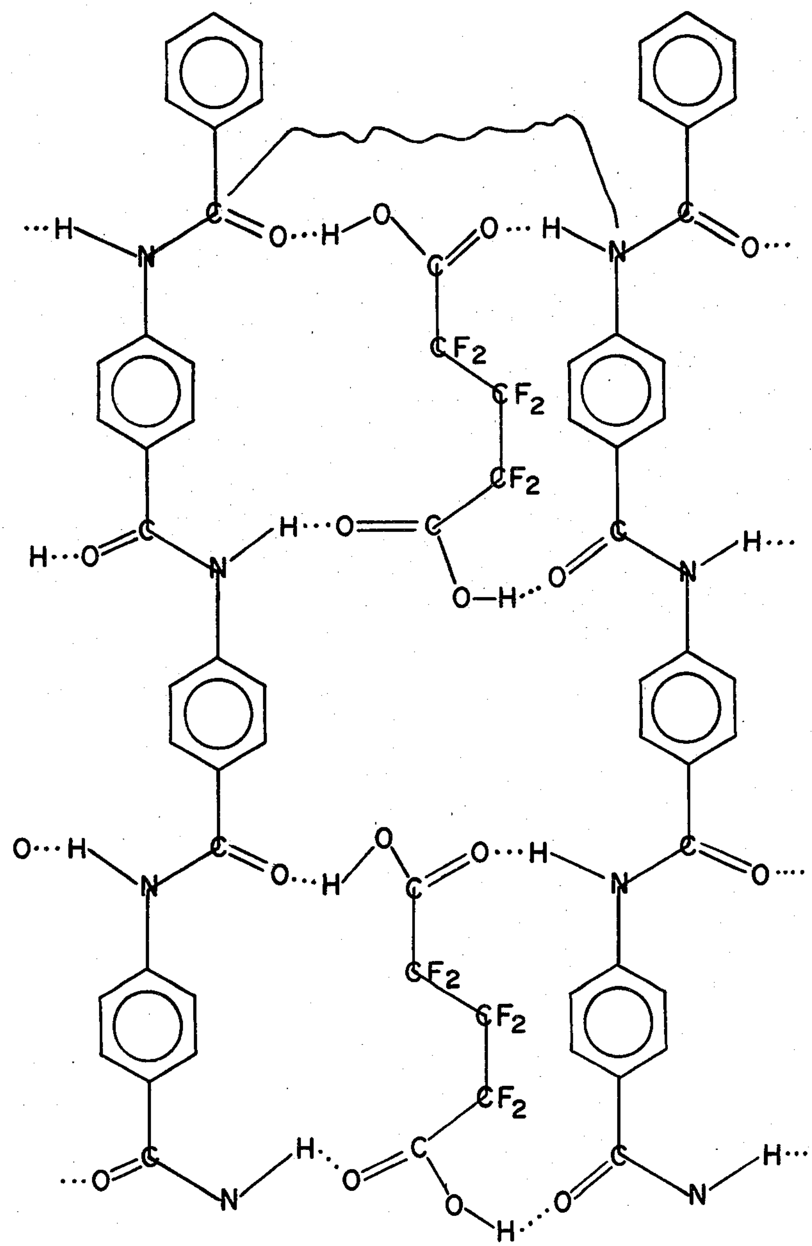
FIG. 5 is a diagrammatic showing of a possible structure of perfluoroglutaric acid/poly-p-benzamide, consistent with the herein data.

The process of obtaining the subject adducts consists essentially of dissolving the polyamide and the diacid in a mutual solvent with or without warming, then allowing the solution to precipitate adducts in accordance with this invention. As seen in the working examples and comparison examples below, the ability of polyamides and dicarboxylic acids to form adducts of the invention is highly specific to the particular polyamides and dicarboxylic acids which are the subject of this invention; and even with those diamides and dicarboxylic acids, the rates of formation of adduct differ widely. It is believed, on the basis of study using geometrically accurate models of the various compounds involved, that the differences observed in rates and the failures to form adducts are a result of the differing ease with which the various polyamides and the various diacids fit together into a structure such as illustrated in FIGS. 4 and 5 hereof.

In particular, it was found by use of models that the length of the fully extended perfluoroglutaric acid molecular chain and the length of the fully extended e-caproamide base unit in nylon-6 are quite close to one another; whereas the fit of the caproamide base unit with perfluorosuccinic acid and with perfluoroadipic acid was poor. Moreover, the fit of the perfluoroglutaric acid with the amide groups along the nylon-66 chain is not as good as the fit with nylon-6. There was no fit between the perfluorinated diacids and the amide groups in various other aliphatic polyamides tested as shown in the comparison examples below. There is a reasonable fit between the length of the extended perfluoroglutaric acid molecule and the length between two consecutive amide residues in the aromatic polyamides above specified for use in this invention.

These facts are believed to show that the diacids may be incorporated in the adduct between adjacent chains or adjacent folds of a single chain. Possibilities are schematically illustrated in FIGS. 4 and 5. In these figures, it will be noted that the diacid is held at a carbonyl oxygen atom and a hydroxyl oxygen atom by a hydrogen bond to a carbonyl oxygen atom and to an amido nitrogen atom, respectively, along one base unit of the polymer, and likewise along another base unit of the polymer. These two base units are favorably placed for forming such structure, in poly-e-caproamide and in poly-p-benzamide, because the polymer chains are normally folded lengthwise (as is indicated by the wavy line connecting the two chains illustrated in FIG. 4 and in FIG. 5), with the result that the carbonyl groups and the amide groups of adjacent folds in the chains fall opposite to each other.

As illustrated in comparison Example H below, it was found that salts of the dibasic acids do not produce solid adducts; and comparison Example A demonstrates that without being fluorinated, the diacids do not form crystalline adducts. It is believed that the hydrogen of the carboxyl group is involved in forming the adducts, and that the fluorination enhances the ability of the acids to employ protons for hydrogen bonding. The greater rigidity of the fluorinated chain, as compared with the non-fluorinated one, may contribute to the ease of hydrogen bond formation.

Study of polycaproamides of various chain lengths indicated that a minimum length is necessary in order to lead to formation of the subject adducts. This length was determined to be about 25 base units, i.e., about 25 amide groups, in the poly-e-caproamide chain. Thus, when a polymer averaging 18 base units was tested, the only sign of adduct formation after 48 hours, 72 hours and 7 days was a very small amount of haze in the polymer solution. When the number of base units was increased to an average of 26, 36, and finally 75, more precipitate of increasing solidity was formed in the same test. It will be appreciated that in these polymers, some portions of the polymer are of longer chain length than other portions and that these higher molecular weight portions can form the quantity of solid adduct observed when using polymers of relatively low molecular weight. In accordance with this invention, aliphatic polyamide components of the adducts preferably contain at least 75 amide groups in the polymer chain and aromatic polyamide components preferably contain at least 50 amide groups in the polymer chain.

The number of base units per molecule of polymer (i.e. the degree of polymerization) above discussed was determined by end group analysis.

The following examples are illustrative of this invention and of the best mode contemplated by the inventors for carrying out the invention but are not to be interpreted in a limiting sense. The polyamides employed were obtained from commercial sources or were produced by known methods; in particular the poly-p-benzamide, poly(p-phenylene terephthalamide) and poly(p-benzanilidene terephthalamide) were prepared by the procedure of Yamazaki et al.—Journal of Polymer Science, Polymer Chemistry Edition, vol. 13 of 1975, article beginning page 1373. The dicarboxylic acids were obtained from PCR Research Chemicals Inc. of Gainesville, Florida. Because of their hygroscopic nature, exposure of the fluorinated diacids to air humidity was minimized.

EXAMPLE 1

10 g (0.089 mole of base units) of nylon-6 (number average molecular weights of 19,000 and 38,500 made no difference) were dissolved in 80 mL trifluoroethanol. To this solution 10.7 g (0.045 mole) of perfluoroglutaric acid were added and the mixture warmed to ca. 50° C. to effect a fast dissolution. Then the solution was allowed to cool.

Within less than an hour the whole system solidified to yield a highly crystalline solid material. (When the dissolution and heating cycle were repeated for nylon-6 or perfluoroglutaric acid alone, no solidification took place.) An overnight drying in the vacuum oven at room temperature removed the trifluoroethanol solvent (as shown by gravimetry). The Wide Angle X-Ray Diffraction pattern (FIG. 1) of the dried adduct is radically different from those of the starting materials, indicating a novel structure.

Upon immersion in water the diacid content of the adduct is leached out without appreciably changing the size or shape of the particles, leaving highly porous nylon-6. Titration of the aqueous phase showed that the stoichiometry of the adduct corresponded to that of the feed, viz. two nylon-6 units for each perfluoroglutaric diacid molecule, i.e. one amide group of the polymer for each carboxylic acid group provided by the total added dicarboxylic acid.

The vacuum dried 2:1 adduct described in this Example 1 fully melts at 111° C. (by DSC and by microscopy). Upon quenching, a glassy substance is obtained.

The material can be formed into useful shapes such as tubing, sheet, or film by extrusion, casting or molding above its melting point. By immersion in water, such shaped objects can be converted to a lower density, porous form resulting from leaching out acid therein, useful, e.g. as a filtration device or a semipermeable membrane.

Fibers can be melt spun from the adduct, and can be leached to remove the fluorinated acid, while being held taut. Subsequently these fibers will be drawn at a temperature such that the microvoids from the leaching procedure are healed, thereby producing fibers of high tenacity.

EXAMPLE 2

A similar adduct was obtained likewise from nylon-6 and perfluoroglutaric acid when the mixing was performed in m-cresol solvent; but because of its lesser volatility compared to trifluoroethanol, m-cresol is generally less convenient to use.

EXAMPLE 3

When a mole ratio of 2:1 nylon-6 base units: perfluorosuccinic acid were mixed in a solution containing 20% reactants in trifluoroethanol, an adduct was formed. In this case, the precipitation of adduct crystals was very slow and took several days to completion. This is in distinct contrast with Example 1 in which the completion of the reaction was within an hour. The Wide Angle X-Ray Diffraction pattern indicates this adduct to be isomorphic with the adduct of nylon-6 and perfluoroglutaric acid. Titration indicated one diacid molecule per two amide residues. The melting point of this adduct is about 108° C.

EXAMPLE 4

(A) A mixture of nylon-6 with perfluoroacids in a mole ratio of 2:1 of nylon-6 base units: diacid molecules was prepared in trifluoroethanol. When the perfluoroacids were equimolar amounts of perfluorosuccinic acid and perfluoroadipic acid, an adduct was obtained within 24 hours which is isomorphic with the adduct of nylon-6 with perfluoroglutaric acid.

(B) When this Example 4 was repeated but with equimolar amounts of perfluoroadipic acid and perfluoroglutaric acid only a small amount of adduct was formed after about a week, containing only nylon-6 and perfluoroglutaric acid.

EXAMPLE 5

1.13 g (0.005 mole of base units) of nylon-66 [poly(hexamethylene adipamide)] were dissolved in 10 mL trifluorethanol. To this solution 1.2 g (0.005 mole) of perfluoroglutaric acid were added. The solution was warmed several minutes at 50° C. to effect a complete dissolution. A complex of the polymer and the perfluorinated diacid started precipitating in discernible quantities after about 72 hours at room temperature.

The vacuum dried adduct described in this Example 5 fully melts at ca. 75° C. Its Wide Angle X-Ray Diffraction pattern, as can be seen from FIG. 2 hereof, dffers radically from that of nylon-66 per se.

EXAMPLE 6

Poly-p-benzamide of molecular weight of the order of 10,000 was dissolved in dimethylacetamide containing 5% by weight of LiCl, in a sealed glass vessel heated to 130° C. To the solution perfluoroglutaric acid was added in an amount of one diacid molecule per two amide groups. Very fast precipitation of an adduct ensued. The solid adduct was pressed and filtered hot and washed several times with pure dimethylacetamide, then was dried under high vacuum at 135° C. Its Wide Angle X-Ray Diffraction pattern indicates the adduct to be a novel structure resembling neither poly-p-benzamide or perfluoroglutaric acid, nor the adducts of nylon-6 or nylon-66 (FIG. 3).

The adduct described in this Example 6 softens at about 280° C. and melts above 300° C. with some discoloration. This is in contradistinction to the behavior of poly-p-benzamide per se, which decomposes and chars instead of melting.

EXAMPLE 7

An adduct was prepared as is described in Example 6, but with the polymer being poly(p-benzanilidene terephthalamide) of molecular weight about 10,000 and prepared from 4,4′-diaminobenzanilide and terephthalic acid. X-ray diffraction scans indicated this adduct and the adduct in Example 6 to be isomorphic.

EXAMPLE 8

An adduct was prepared as in Example 7 but with the polymer being poly(p-phenylene terephthalamide) of molecular weight about 10,000 (prepared from p-phenylenediamine and terephthalic acid). A single phase crystalline adduct was obtained.

EXAMPLE 9

An adduct was prepared as in Example 1 but with the polymer being a mixture of equal weights of nylon-6 and nylon-66. A single phase crystalline adduct of crystal structure similar to that of the adduct of Example 1 was obtained. The X-ray pattern showed no trace of nylon 66 or of a separate crystalline phase of nylon 66/perfluoroglutaric acid adduct.

EXAMPLE 10

An adduct was prepared from nylon-6 as in Example 1 but with perfluoroadipic acid replacing the perfluoroglutaric acid of Example 1. Its Wide Angle X-Ray Diffraction pattern is shown by FIG. 1, Curve C.

EXAMPLE 11

An adduct was prepared from nylon-66 as in Example 5 but with perfluoroadipic acid replacing the perfluoroglutaric acid of Example 5.

COMPARISON EXAMPLE A

When Example 1 was repeated but with glutaric acid replacing the perfluoroglutaric acid, no solidification took place from the solution.

COMPARISON EXAMPLE B

When Example 1 was repeated but with other perfluorinated acids replacing the perfluoroglutaric acid, no solidification took place from the solution. Specifically, such other acids tested were trifluoroacetic, perfluorobutyric, and perfluoroterephthalic acid.

COMPARISON EXAMPLE C

When Example 5 was repeated but with other perfluorinated acids, no adduct formed from the solution. Specifically, such other acids tested with nylon-66 were perfluorosuccinic, perfluoroadipic, equimolar amounts of perfluorosuccinic and perfluoroglutaric (practically no adduct formed), and equimolar amounts of perfluorosuccinic and perfluoroadipic acid.

COMPARISON EXAMPLE D

When Example 1 was repeated using 2:1 mole ratio of base units of nylon-11: perfluoroglutaric acid molecules in hexafluoroisopropanol or m-cresol, no adduct formed from the solution.

COMPARISON EXAMPLE E

Carrying out Comparison Example D but with nylon-12 gave no adduct from the solution, using either solvent.

COMPARISON EXAMPLE F

Carrying out Comparison Example D using m-cresol solvent, but with poly(hexamethylene terephthalamide), gave no adduct in the solution.

COMPARISON EXAMPLE G

Carrying out Comparison Example D using hexafluoroisopropanol solvent, but with poly(hexamethylene nonanediamide), i.e. nylon-69, gave no adduct from the solution.

COMPARISON EXAMPLE H

When Example 1 was repeated but with Li salt of perfluoroglutaric acid, no solid precipitated from the solution. The solid product obtained after drying and annealing was amorphous, rather than crystalline.

COMPARISON EXAMPLE I

When Example 1 was repeated but with trifluoroacetic acid as solvent, no solid adduct was formed.

We claim:

1. A crystalline adduct of a polyamide having aminocarboxylic acid moieties and a perfluorodicarboxylic acid, in which the number of carbon and nitrogen atoms in one monomeric unit chain of an aminocarboxylic acid moiety of said polyamide is the same as the sum of the carbon atoms in one chain of said perfluorodicarboxylic acid plus 2, within $\pm 1$.

2. A crystalline adduct of a polyamide of the group consisting of poly-e-caproamide, polyhexamethyleneadipamide, poly-p-benzamide, poly-p-phenyleneterephthalamide, poly-p-benzanilidene terephthalamide, and mixtures thereof, in 1:1 mole ratio of amide groups of the polymer: carboxylic acid groups provided by the total added dicarboxylic acid below specified; said dicarboxylic acid being of the group consisting of perfluorosuccinic acid, perfluoroglutaric acid, perfluoroadipic acid and mixtures thereof; and said polyamide containing at least about 25 amide groups in the polymer chain.

3. Adduct in accordance with claim 2 wherein aliphatic polyamide components contain at least 75 amide groups in the polymer chain and aromatic polyamide components contain at least 50 amide groups in the chain.

4. Adduct in accordance with claim 3 wherein the polyamide is poly-e-caproamide and the dicarboxylic acid is perfluorosuccinic acid; the melting point is about 108° C., and the Wide Angle X-Ray Diffraction pattern is as in attached FIG. 1, Curve A.

5. Adduct in accordance with claim 3 wherein the polyamide is poly-e-caproamide and the dicarboxylic acid is perfluoroglutaric acid; the melting point is about 111° C.; and the Wide Angle X-Ray Diffraction pattern is as in attached FIG. 1, Curve B.

6. Adduct in accordance with claim 3 wherein the polyamide is poly-e-caproamide and the acid is perfluoroadipic acid; and the Wide Angle X-Ray Diffraction pattern is as in attached FIG. 1, Curve C.

7. Adduct in accordance with claim 3 wherein the polyamide is polyhexamethyleneadipamide and the dicarboxylic acid is perfluoroglutaric acid; the melting point is about 75° C.; and the Wide Angle X-Ray Diffraction pattern is as in attached FIG. 2, Curve A.

8. Adduct in accordance with claim 3 wherein the polyamide is poly-p-benzamide and the dicarboxylic acid is perfluoroglutaric acid; and the Wide Angle X-Ray Diffraction pattern is as in attached FIG. 3, Curve A.

9. Adduct in accordance with claim 3 wherein the polyamide is poly-p-phenyleneterephthalamide and the dicarboxylic acid is perfluoroglutaric acid.

10. A crystalline adduct of a polyamide having diamine moieties and dicarboxylic moieties and a perfluorocarboxylic acid; in which the number of carbon and nitrogen atoms of a monomeric unit chain of a diamine moiety of said polyamide and the number of carbon atoms in one monomeric unit chain of dicarboxylic acid moiety of the polyamide:

(a) are equal within two atoms; and
(b) have a mean within ±1 of the sum of carbon atoms in one claim of said perfluorodicarboxylic acid plus 2.

11. Adduct in accordance with claim 1 or 10 wherein said polyamide comprises at least about 25 amide linkages in the polymer chain.

12. Adduct according to claim 11 wherein the mole ratio of amide groups in said polymer to carboxylic acid groups in said perfluorodicarboxylic acid is about 1 to about 1.

* * * * *